United States Patent
Hamilton et al.

(10) Patent No.: US 8,156,163 B1
(45) Date of Patent: Apr. 10, 2012

(54) STORAGE SERVER CLUSTER IMPLEMENTED IN AND OPERATING CONCURRENTLY WITH A SET OF NON-CLUSTERED STORAGE SERVERS

(75) Inventors: Eric C. Hamilton, Durham, NC (US); Peter Corbett, Lexington, MA (US)

(73) Assignee: NetApp, Inc., Sunnyvale, CA (US)

( * ) Notice: Subject to any disclaimer, the term of this patent is extended or adjusted under 35 U.S.C. 154(b) by 422 days.

(21) Appl. No.: 12/490,202

(22) Filed: Jun. 23, 2009

(51) Int. Cl.
*G06F 7/00* (2006.01)
(52) U.S. Cl. ........................................ 707/812; 715/255
(58) Field of Classification Search ................... 707/812
See application file for complete search history.

(56) References Cited

U.S. PATENT DOCUMENTS

| | | | |
|---|---|---|---|
| 2006/0101081 A1* | 5/2006 | Lin et al. | 707/200 |
| 2006/0236033 A1* | 10/2006 | Guinn et al. | 711/118 |

OTHER PUBLICATIONS

Co-pending U.S. Appl. No. 12/287,099, filed Oct. 6, 2008.

* cited by examiner

*Primary Examiner* — Fazlul Quader
(74) *Attorney, Agent, or Firm* — Perkins Coie LLP

(57) ABSTRACT

A storage controller is operable concurrently as an independent storage server and as at least a portion of a node of a storage server cluster. A network storage system comprises multiple storage controllers and multiple independent storage servers, each storage server implemented in a separate storage controller, each of the storage server configured to present to users a separate system image of stored data. The storage servers are independently operable and manageable. The system further includes a storage server cluster that includes cooperating storage server nodes, distributed among the storage controllers. The storage server cluster presents to users a single system image of data stored in the server cluster independently of the node or nodes in which said data resides. The storage server cluster is operable independently of the independent storage servers and is operable concurrently with operation of at least one of the independent storage servers.

20 Claims, 12 Drawing Sheets

STORAGE SERVER CLUSTER IMPLEMENTED IN AND OPERATING CONCURRENTLY WITH A SET OF NON-CLUSTERED STORAGE SERVERS

CROSS REFERENCE TO RELATED APPLICATIONS

This Application incorporates by reference U.S. patent application Ser. No. 12/287,099, filed Oct. 6, 2008, and entitled "READ-ONLY MIRRORING FOR LOAD SHARING"

FIELD OF THE INVENTION

At least one embodiment of the present invention pertains to network storage systems, and more particularly, to a storage server cluster implemented in, and operating concurrently with, a set of non-clustered storage servers.

BACKGROUND

A storage controller is a physical processing device that is used to store and retrieve data on behalf of one or more hosts. A network storage controller can be configured (e.g., by hardwiring, software, firmware, or any combination thereof) to operate as a storage server that serves one or more clients on a network, to store and manage data in a set of mass storage devices, such as magnetic or optical storage-based disks or tapes. Some storage servers are designed to service file-level requests from hosts, as is commonly the case with file servers used in a network attached storage (NAS) environment. Other storage servers are designed to service block-level requests from hosts, as with storage servers used in a storage area network (SAN) environment. Still other storage servers are capable of servicing both file-level requests and block-level requests, as is the case with certain storage servers made by NetApp®, Inc. of Sunnyvale, Calif., employing the Data ONTAP® 7G or GX storage operating systems.

In at least one implementation, a storage server makes data available to a client (host) system by presenting or exporting to clients one or more logical containers of data, such as volumes. A "volume" is an abstraction of physical storage, combining one or more physical mass storage devices (e.g., disks) or parts thereof into a single logical storage object, and which is managed as a single administrative unit, such as a single file system. A "file system" is a structured (e.g., hierarchical) set of stored logical containers of data (e.g., volumes, logical unit numbers (LUNs), directories, files). Note that a file system does not have to include storage that is based on "files" per se.

From the perspective of a client system, each volume can appear to be a single disk drive. However, each volume can represent the storage space in a single physical storage device, a redundant array of independent disks (RAID) or a RAID group, an aggregate of some or all of the storage space in multiple physical storage devices, or any other suitable set of storage space. An "aggregate" is a logical aggregation of physical storage; i.e., a logical container for a pool of storage, combining one or more physical mass storage devices (e.g., disks) or parts thereof into a single logical storage object, which contains or provides storage for one or more other logical data sets at a higher level of abstraction (e.g., volumes).

A network storage system can have a very simple architecture; for example, an individual storage server can provide one or more clients on a network with access to data stored in a mass storage subsystem. As another example, two or more individual storage servers may be connected and configured as failover partners, to increase reliability, such as in a storage failover (SFO) or controller failover (CFO) configuration. Recently, however, with storage capacity demands increasing rapidly in almost every business sector, there has been a trend towards the use of clustered network storage systems, to improve scalability.

In a clustered storage system, two or more storage server "nodes" are connected in a distributed architecture. The nodes are generally implemented by two or more storage controllers. Each storage server "node" is in fact a storage server, although it is implemented with a distributed architecture. For example, a storage server node can be designed to include a network module ("N-module") to provide network connectivity and a separate data module (e.g., "D-module") to provide data storage/access functionality, where the N-module and D-module communicate with each other over some type of physical interconnect. Two or more such storage server nodes are typically connected to form a storage "cluster", where each of the N-modules in the cluster can communicate with each of the D-modules in the cluster.

A clustered architecture allows convenient scaling through the addition of more N-modules and D-modules, all capable of communicating with each other. Further, a storage cluster may present a single system image of stored data to clients and administrators, such that the actual location of data can be made transparent to clients and administrators. An example of a storage controller that is designed for use in a clustered system such as this is a NetApp FAS-series Filer which employs NetApp's Data ONTAP® GX storage operating system.

Both clustered and non-clustered network storage systems have advantages. However, in storage server products available today these two types of systems are mutually exclusive. That is, a storage server is generally designed to operate as part of a clustered storage system or as a non-clustered storage server, but not both. This places limitations upon storage system growth and performance over time and inhibits the most efficient use of storage resources.

For example, a company may use a non-clustered storage system with satisfactory results for a long time, but may conclude at some point in time (e.g., in anticipation of significant corporate growth) that it would be desirable to have a clustered storage system. With conventional technology, the company would have to replace its entire storage system with clustered-enabled devices, even though the existing non-clustered storage system it is using may be fully functional and adequate for many purposes. The company is therefore faced with either continuing to use the existing storage system which becomes less and less optimal over time, potentially adversely affecting business processes, or purchasing an expensive new system and giving up the use of the (also expensive) fully functional existing system. Either choice is likely to prove costly.

SUMMARY

The techniques introduced here enable a storage controller to operate concurrently as an individual non-clustered storage server and as at least a portion of a node of a storage server cluster. As a result, a given number, N, of storage controllers can effectively operate as N+1 storage servers, i.e., as N individual storage servers plus a storage server cluster. Further, the techniques introduced here enable the ownership of any given data volume to be easily transitioned from exclusive ownership by an individual storage server to ownership by the cluster, or vice versa. These techniques collectively allow convenient, gradual transitioning of a non-clustered storage system into a clustered storage system in response to changing storage needs.

As described in greater detail below, in accordance with certain embodiments, a network storage system can comprise a plurality of storage controllers and a plurality of storage servers, where each of the storage servers is implemented in a separate one of the plurality of storage controllers, and where each of the storage servers is configured to present to users a separate system image of stored data. The system further can include a storage server cluster that includes a plurality of cooperating storage server nodes, distributed among the plurality of storage controllers, where the storage server cluster is configured to present to users a single system image of data stored in the storage server cluster independently of the storage server node or nodes in which said data resides, and where the storage server cluster is operable concurrently with operation of at least one of the plurality of storage servers.

The plurality of storage servers are independently operable and independently manageable. Further, the storage server cluster is operable independently of the plurality of storage servers.

The plurality of storage servers separately implement a plurality of distinct file systems, whereas the storage server nodes of the cluster collectively implement one or more file systems in a single global namespace. Each of the individual storage servers presents to users a separate system image of stored data, whereas data stored in the storage server cluster is presented to users as a single system image regardless of where said data stored in the storage server cluster physically resides. User data owned by any particular one of the plurality of storage servers can only be accessed through that particular storage server that owns the data, whereas user data owned by the cluster can be accessed through any of the plurality of storage server nodes.

Other aspects of the technique will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

System Environment

Figure 1:
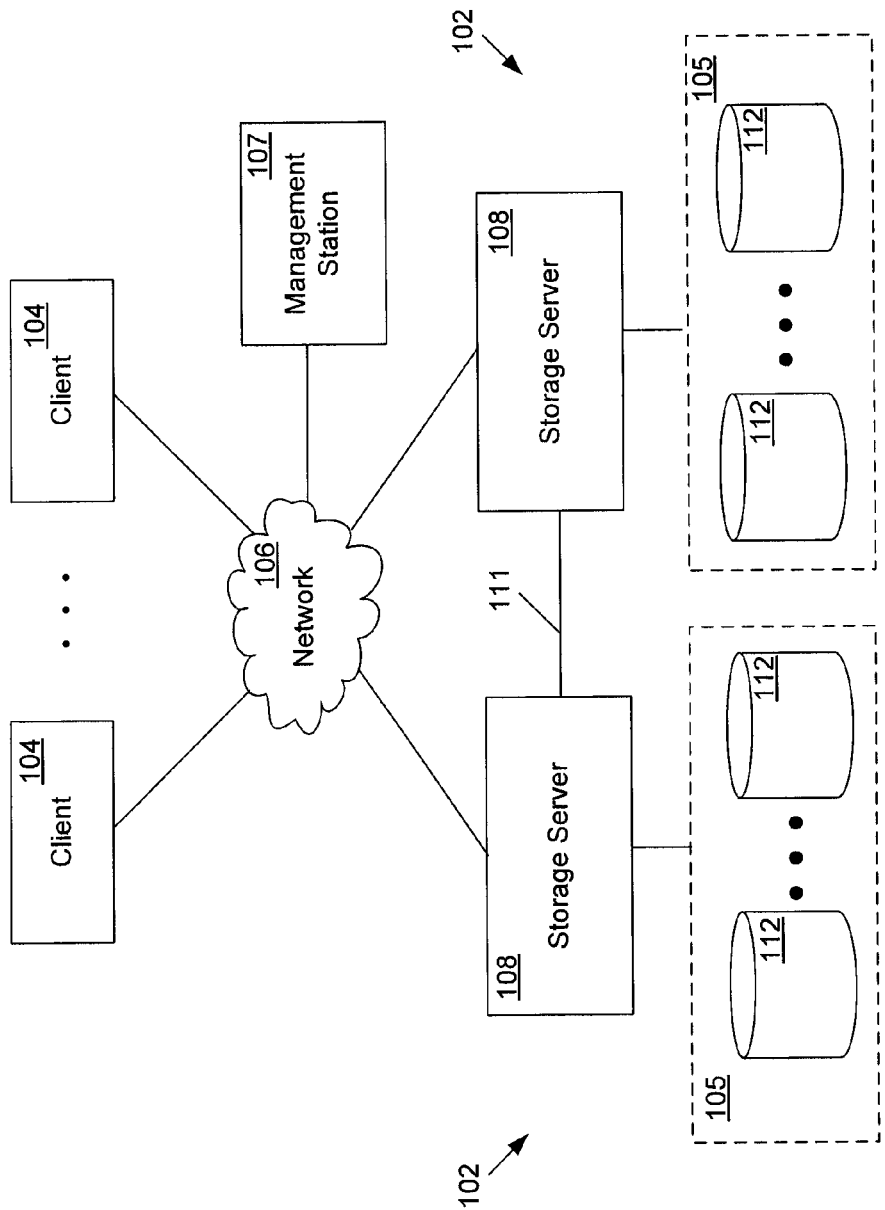
FIG. 1 illustrates a non-clustered network storage system.

FIG. 1 shows an example of a non-clustered network storage system, which includes a plurality of client systems 104, a pair of storage server systems 102, and computer network 106 connecting the client systems 104 and the storage server system 102. As shown in FIG. 1, each storage server system 102 includes a storage controller configured as a storage server 108, and a number of mass storage devices 112, such as disks, in a mass storage subsystem 105. Alternatively, some or all of the mass storage devices 112 can be other types of storage, such as flash memory, solid-state drives (SSDs), tape storage, etc.

FIG. 1 shows the two storage server systems 102 coupled for controller failover (CFO). Specifically, there is a communication link 111 between the storage servers, which can be used to communicate "heartbeat" messages between them so that each can determine whether the other is functional. In a CFO scenario, if either storage server 108 fails, the other storage server can take over for it. In contrast, in a SFO scenario (not shown) such as may be implemented in a clustered system (not shown), if either mass storage subsystem 105 fails, the other mass storage subsystem can be used in its place.

Although there is some level of cooperation between storage servers 108 for purposes of CFO, each storage server 108 is nonetheless operated and managed as a distinct, independent entity, which maintains its own separate file system(s). Hence, the network storage system of FIG. 1 is deemed a non-clustered system.

Each storage server 108 can be, for example, one of the FAS-series of storage server products available from NetApp, Inc. The client systems 104 are connected to the storage server 108 via the computer network 106, which can be a packet-switched network, for example, a local area network (LAN) or wide area network (WAN). Further, the storage server 108 can connected to the disks 112 via a switching fabric (not shown), which can be a fiber distributed data interface (FDDI) network, for example. It is noted that, within the network data storage environment, any other suitable numbers of storage servers and/or mass storage devices, and/or any other suitable network technologies, may be employed.

A storage server 108 can make some or all of the storage space on the disk(s) 112 available to the client systems 104 in a conventional manner. For example, each of the disks 112 can be implemented as an individual disk, multiple disks (e.g., a RAID group) or any other suitable mass storage device(s). A storage server 108 can communicate with the client systems 104 according to well-known protocols, such as the Network File System (NFS) protocol or the Common Internet File System (CIFS) protocol, to make data stored on the disks 112 available to users and/or application programs. A storage server 108 can present or export data stored on the disk 112 as volumes and/or qtrees, to each of the client systems 104. Various functions and configuration settings of either storage server 108 can be controlled by a user, e.g., a storage administrator, from a management station 107 coupled to the network 106.

Figure 2:
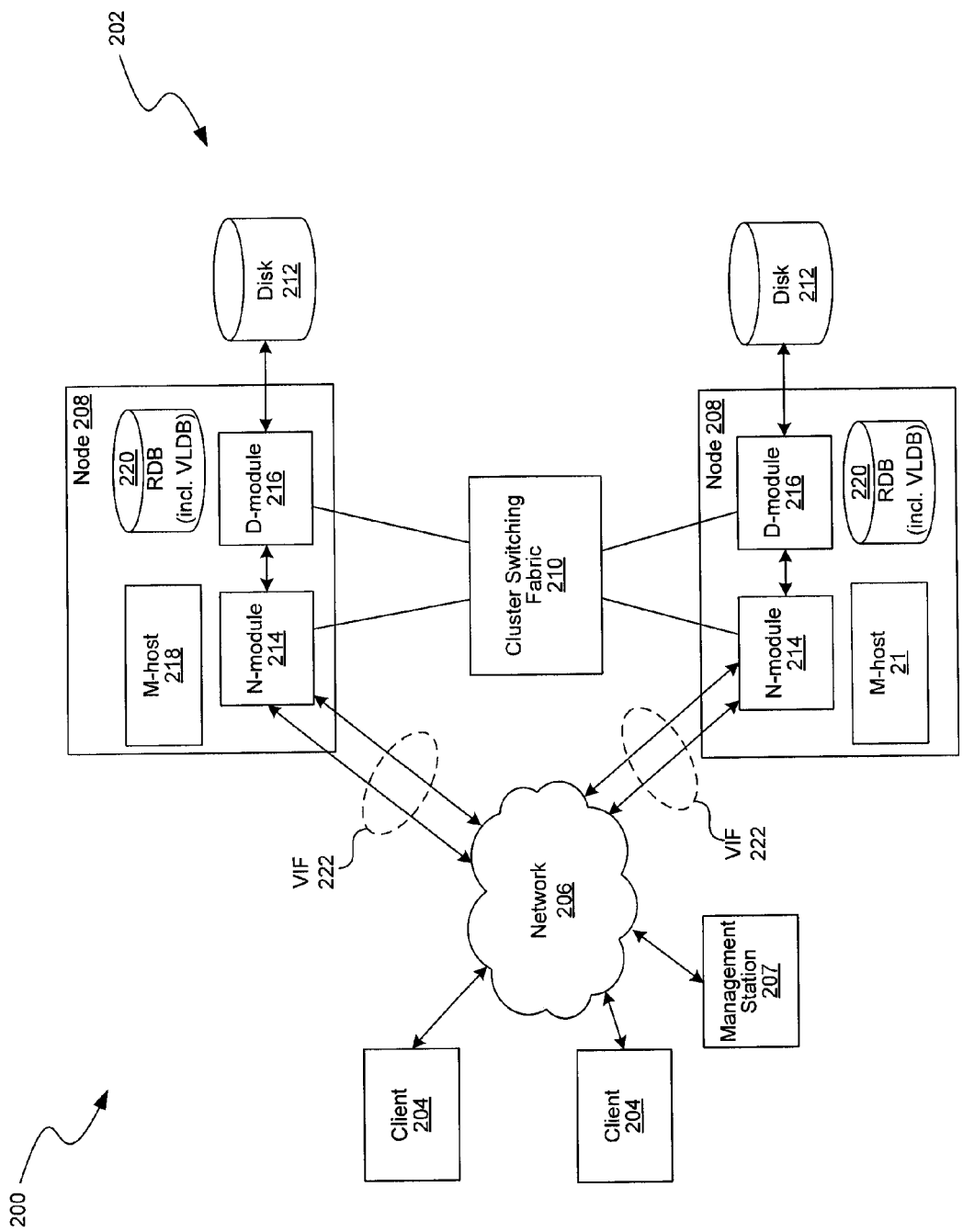
FIG. 2 illustrates a clustered network storage system.

FIG. 2 shows an example of a clustered network storage system. The system 200 includes a plurality of client systems 204, a clustered storage server system 202 ("cluster"), and a computer network 206 connecting the client systems 204 and the clustered storage server system 202. As shown in FIG. 2, the clustered storage server system 202 includes a plurality of storage server nodes (or simply "nodes") 208, a cluster switching fabric 210, and a plurality of mass storage devices 212, which can be disks for example, as henceforth assumed here to facilitate description. Alternatively, some or all of the mass storage devices 212 can be other types of storage, such as flash memory, SSDs, tape storage, etc.

Each node 208 essentially provides similar functionality to that of a storage server 108 in FIG. 1. However, unlike the storage servers 108 in FIG. 1, the nodes 208 are not operated and managed as distinct independent entities. Rather, they are operated and managed collectively as a single entity, i.e., a cluster 202. The cluster presents to users and administrators a single system image of all data stored by the cluster, regardless of where any particular data resides within the cluster.

Each of the nodes 208 is configured to include several modules, including an N-module 214, a D-module 216, and an M-host 218 (each of which can be implemented by using a separate software module) and an instance of a replicated database (RDB) 220. RDB 220 can be implemented as a number of individual databases, each of which has an instance located in each of the nodes 208. The N-modules 214 include functionality that enables their respective nodes 208 to connect to one or more of the client systems 204 over the network 206, while the D-modules 216 provide access to the data stored on their respective disks 212. The M-hosts 218 provide management functions for the clustered storage server system 202, including user interface functionality to enable an administrator to manage and control the cluster. Accordingly, each of the server nodes 208 in the clustered storage server arrangement provides the functionality of a storage server.

The RDB 220 is a database that is replicated throughout the cluster, i.e., each node 208 includes an instance of the RDB 220. The various instances of the RDB 220 are updated regularly to bring them into synchronization with each other. The RDB 220 provides cluster-wide storage of various information used by all of the nodes 208 and includes a volume location database (VLDB). The VLDB indicates the location within the cluster of each volume in the cluster (i.e., the owning D-module 216 for each volume) and is used by the N-modules 214 to identify the appropriate D-module 216 for any given volume to which access is requested. Each volume in the system is represented by a data set identifier (DSID) and a master data set identifier (MSID), each of which is stored in two places: on disk in the volume itself and in the VLDB. The DSID is a system internal identifier of a volume. The MSID is an external identifier for a volume, used in file handles (e.g., NFS) and the like. The VLDB stores the identity and mapping (MSIDs-to-DSIDs) of all volumes in the system.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules and D-modules in FIG. 2, there may be differing numbers of N-modules and/or D-modules in accordance with various embodiments of the technique described here. For example, there need not be a one-to-one correspondence between the N-modules and D-modules. As such, the description of a node 208 comprising one N-module and one D-module should be understood to be illustrative only.

Various functions and configuration settings of the cluster 202 can be controlled by a user, e.g., a storage administrator, from a management station 207 coupled to the network 206.

A plurality of virtual interfaces (VIFs) 222 allow the disks 212 associated with the nodes 208 to be presented to the client systems 204 as a single shared storage pool. FIG. 2 depicts only the VIFs at the interfaces to the N-modules 214 for clarity of illustration.

Figure 3:
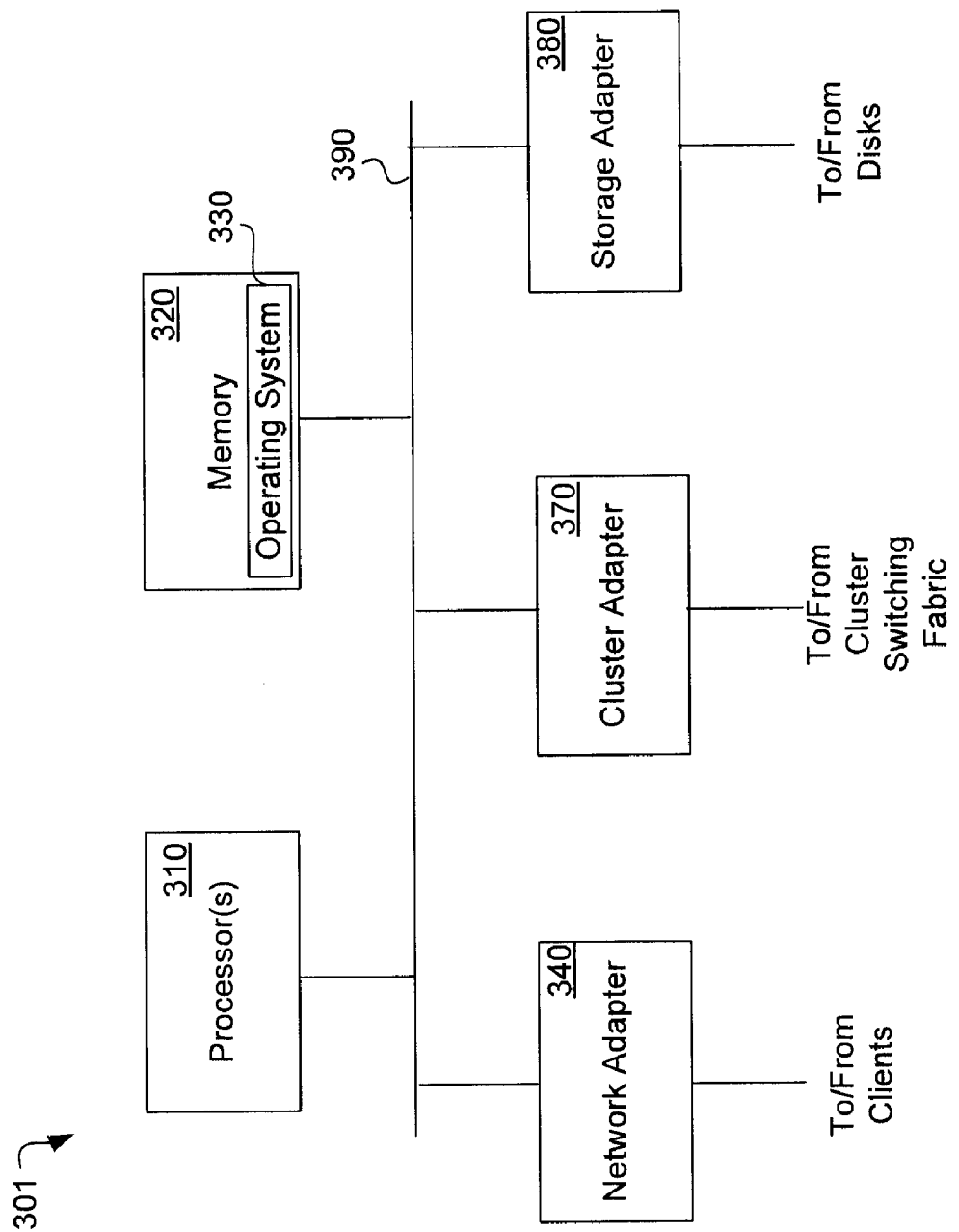
FIG. 3 is a high-level block diagram showing an example of the hardware architecture of a storage controller.

FIG. 3 is a diagram illustrating an example of a storage controller that can implement one or more storage servers 108, or one or more storage server nodes 208. In an exemplary embodiment, the storage controller 301 includes a processor subsystem that includes one or more processors. The storage controller 301 further includes a memory 320, a network adapter 340, a cluster access adapter 370 and a storage adapter 380, all interconnected by an interconnect 390. The cluster access adapter 370 includes a plurality of ports adapted to couple the node 208 to other nodes 208 of the cluster. In the illustrated embodiment, Ethernet is used as the clustering protocol and interconnect media, although other types of protocols and interconnects may be utilized within the cluster architecture described herein. In alternative embodiments where the N-modules and D-modules are implemented on separate storage systems or computers, the cluster access adapter 270 is utilized by the N-module 214 and/or D-module 216 for communicating with other N-modules and/or D-modules of the cluster.

The storage controller 301 can be embodied as a single- or multi-processor storage system executing a storage operating system 330 that preferably implements a high-level module, called a storage manager, to logically organize the information as a hierarchical structure of named directories, files and special types of files called virtual disks (hereinafter generally "blocks") on the disks. Illustratively, one processor 310 can execute the functions of the N-module 214 on the node 208 while another processor 310 executes the functions of the D-module 216.

The memory 320 illustratively comprises storage locations that are addressable by the processors and adapters 340, 370, 380 for storing software program code and data associated with the present invention. The processor 310 and adapters may, in turn, comprise processing elements and/or logic circuitry configured to execute the software code and manipulate the data structures. The storage operating system 330, portions of which is typically resident in memory and executed by the processing elements, functionally organizes the storage controller 301 by (among other things) invoking storage operations in support of the storage service provided by the node 208. It will be apparent to those skilled in the art that other processing and memory implementations, including various computer readable storage media, may be used for storing and executing program instructions pertaining to the technique introduced here.

The network adapter 340 includes a plurality of ports to couple the storage controller 301 to one or more clients 204 over point-to-point links, wide area networks, virtual private networks implemented over a public network (Internet) or a shared local area network. The network adapter 340 thus can include the mechanical, electrical and signaling circuitry needed to connect the storage controller 301 to the network 206. Illustratively, the network 206 can be embodied as an Ethernet network or a Fibre Channel (FC) network. Each client 204 can communicate with the node 208 over the network 206 by exchanging discrete frames or packets of data according to pre-defined protocols, such as TCP/IP.

The storage adapter 380 cooperates with the storage operating system 330 The storage controller 301 to access information requested by the clients 204. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on disks 212. The storage adapter 380 includes a plurality of ports having input/output (I/O) interface circuitry that couples to the disks over an I/O interconnect arrangement, such as a conventional high-performance, Fibre Channel (FC) link topology.

Storage of information on disks 212 can be implemented as one or more storage volumes that include a collection of physical storage disks cooperating to define an overall logical arrangement of volume block number (VBN) space on the volume(s). The disks 212 can be organized as a RAID group. One or more RAID groups together form an aggregate. An aggregate can contain one or more volumes/file systems.

The storage operating system 330 facilitates clients' access to data stored on the disks 212. In certain embodiments, the storage operating system 330 implements a write-anywhere file system that cooperates with one or more virtualization modules to "virtualize" the storage space provided by disks 212. In certain embodiments, a storage manager 460 (FIG. 4) logically organizes the information as a hierarchical structure of named directories and files on the disks 212. Each "on-disk" file may be implemented as set of disk blocks configured to store information, such as data, whereas the directory may be implemented as a specially formatted file in which names and links to other files and directories are stored. The virtualization module(s) allow the storage manager 460 to further logically organize information as a hierarchical structure of blocks on the disks that are exported as named logical unit numbers (LUNs).

Figure 4:
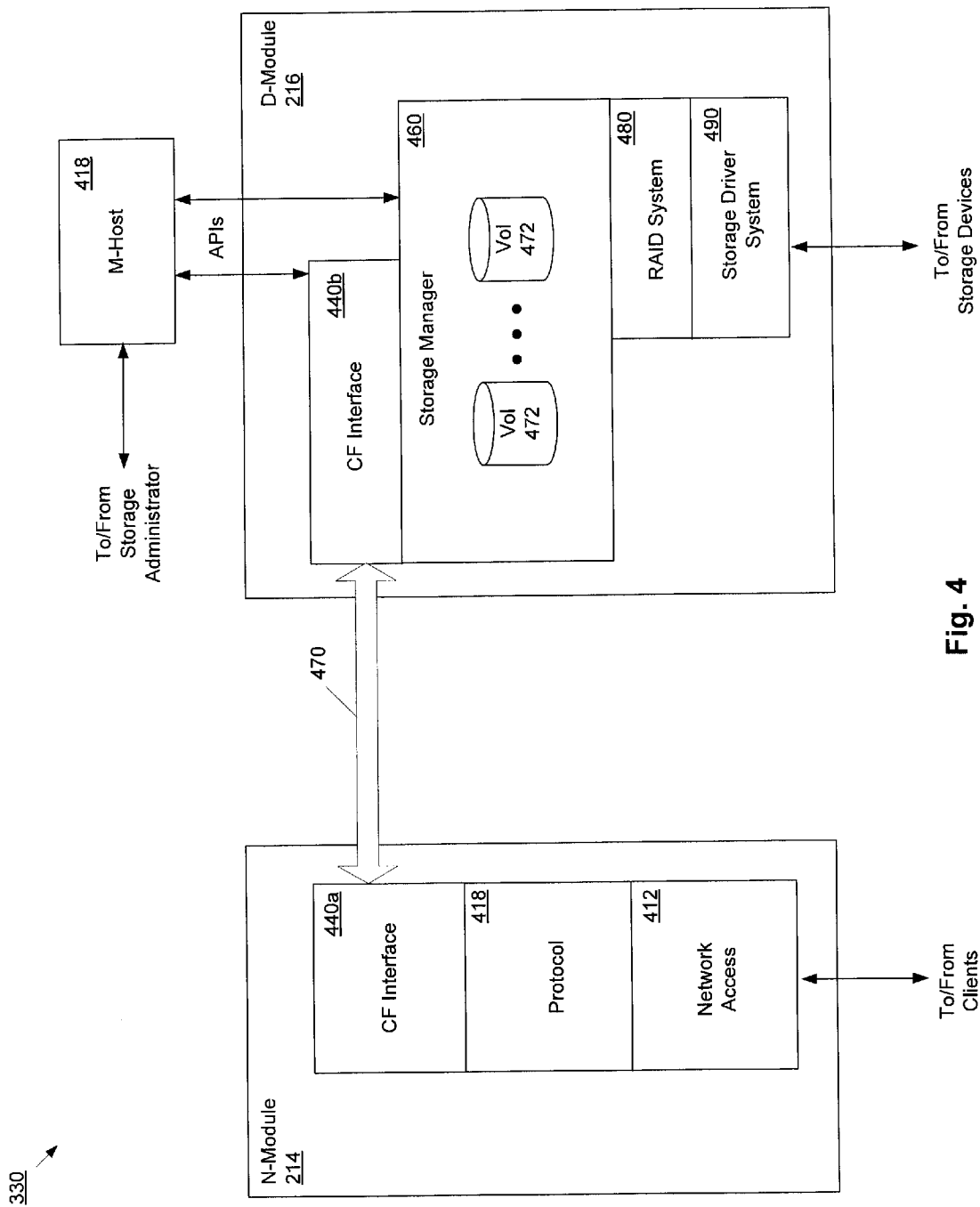
FIG. 4 illustrates an example of a storage operating system of a storage server node.

FIG. 4 illustrates an example of the storage operating system 330, which can be used in a clustered environment such as shown in FIG. 2. In the illustrated embodiment the storage operating system 330 implements the N-module 214, D-module 216 and M-host 218, as described above. The N-module 214 comprises multiple functional layers organized to form an integrated network protocol stack. The network protocol stack provides data paths for clients to access information stored on the node using block and file access protocols. The network protocol stack in combination with underlying processing hardware forms the N-module 214.

The network protocol stack in the N-module 214 includes a network access layer 412 which includes one or more network drivers that implement one or more lower-level protocols to enable the processing system to communicate over the network 206, such as Ethernet, Internet Protocol (IP), Transport Control Protocol/Internet Protocol (TCP/IP), Fibre Channel Protocol (FCP) and/or User Datagram Protocol/Internet Protocol (UDP/IP). The network protocol stack also includes a multi-protocol layer 418 which implements various higher-level network protocols, such as Network File System (NFS), Common Internet File System (CIFS), Hypertext Transfer Protocol (HTTP), Internet small computer system interface (iSCSI), etc. Further, the network protocol stack includes a cluster fabric (CF) interface module 440a which implements intra-cluster communication with D-modules and with other N-modules.

In addition, the storage operating system 330 includes a set of data access layers organized to provide data paths for accessing information stored on the disks 212 of the node 208; these layers in combination with underlying processing hardware forms the D-module 216. To that end, the data access layers include a storage manager module 460 that manages any number of volumes 472, a RAID system module 480 and a storage driver system module 490.

The storage manager 460 primarily manages a file system (or multiple file systems) and serves client-initiated read and write requests. The RAID system 480 manages the storage and retrieval of information to and from the volumes/disks in accordance a RAID redundancy protocol, such as RAID-4, RAID-5, or RAID-DP, while the disk driver system 490 implements a disk access protocol such as SCSI protocol or FCP.

The data access layers also include a CF interface module 440b to implement intra-cluster communication link 470 with N-modules and/or other D-modules. The nodes 208 in the cluster 202 can cooperate, through their respective CF interface modules 440a and 440b, to provide a single file system image across all D-modules 216 in the cluster 202. Stated another way, the various D-modules 216 can implement multiple distinct file systems within a single global namespace. Thus, any N-module 214 that receives a client request can access any data container within the single file system image located on any D-module 216 of the cluster, and the location of that data container can remain transparent to the client and user.

The CF interface modules 440 implement the CF protocol to communicate file system commands among the modules of cluster over the cluster switching fabric 210 (FIG. 2). Such communication can be effected by a D-module exposing a CF application programming interface (API) to which an N-module (or another D-module) issues calls. To that end, a CF interface module 440 can be organized as a CF encoder/decoder. The CF encoder of, e.g., CF interface 440a on N-module 214 can encapsulate a CF message as (i) a local procedure call (LPC) when communicating a file system command to a D-module 216 residing on the same node or (ii) a remote procedure call (RPC) when communicating the command to a D-module residing on a remote node of the cluster. In either case, the CF decoder of CF interface 440b on D-module 216 de-encapsulates the CF message and processes the file system command.

In operation of a node 208, a request from a client 204 is forwarded as a packet over the network 206 and onto the node 208, where it is received at the network adapter 340 (FIG. 3). A network driver of layer 412 processes the packet and, if appropriate, passes it on to a network protocol and file access layer for additional processing prior to forwarding to the storage manager 460. At that point, the storage manager 460 generates operations to load (retrieve) the requested data from disk 212 if it is not resident in memory 320. If the information is not in memory 320, the storage manager 460 indexes into a metadata file to access an appropriate entry and retrieve a logical VBN. The storage manager 460 then passes a message structure including the logical VBN to the RAID system 480; the logical VBN is mapped to a disk identifier and disk block number (DBN) and sent to an appropriate driver (e.g., SCSI) of the disk driver system 490. The disk driver accesses the DBN from the specified disk 212 and loads the requested data block(s) in memory for processing by the node. Upon completion of the request, the node (and operating system) returns a reply to the client 204 over the network 206.

The data request/response "path" through the storage operating system 330 as described above can be implemented in general-purpose programmable hardware executing the storage operating system 330 as software or firmware. Alternatively, it can be implemented at least partially in specially designed hardware. That is, in an alternate embodiment of the invention, some or all of the storage operating system 330 is implemented as logic circuitry embodied within a field programmable gate array (FPGA) or an application specific integrated circuit (ASIC), for example.

The N-module 214 and D-module 216 can be implemented as processing hardware configured by separately-scheduled processes of storage operating system 330; however, in an alternate embodiment, the modules may be implemented as processing hardware configured by code within a single operating system process. Communication between an N-module 214 and a D-module 216 is thus illustratively effected through the use of message passing between the modules although, in the case of remote communication between an N-module and D-module of different nodes, such message passing occurs over the cluster switching fabric 210. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF API.

The operating system 330 also includes M-host 218, which provides management functions for the cluster 202, including user interface functionality to enable an administrator to manage and control the cluster 202 (e.g., through management station 207). Because each node 208 in the cluster 202 has an M-host 218, the cluster 202 can be managed via the M-host 218 in any node 208 in the cluster 202. The functionality of an M-host 218 includes generating a user interface, such as a graphical user interface (GUI) and/or a command line interface (CLI), for a storage network administrator. The functionality of an M-host 218 can also include facilitating the provisioning of storage, creating and destroying volumes, installation of new software, controlling access privileges, scheduling and configuring data backups, scheduling data mirroring function, and other functions. The M-host 218 communicates with its local D-module 214 or with any remote D-module by using a set of APIs, the details of which are not germane to this disclosure. The M-host 218 includes network interfaces (not shown) to communicate with D-modules and to communicate with one or more external computers or input/output terminals used by network administrators.

Concurrent Clustered and Non-Clustered Operation

Figure 5:
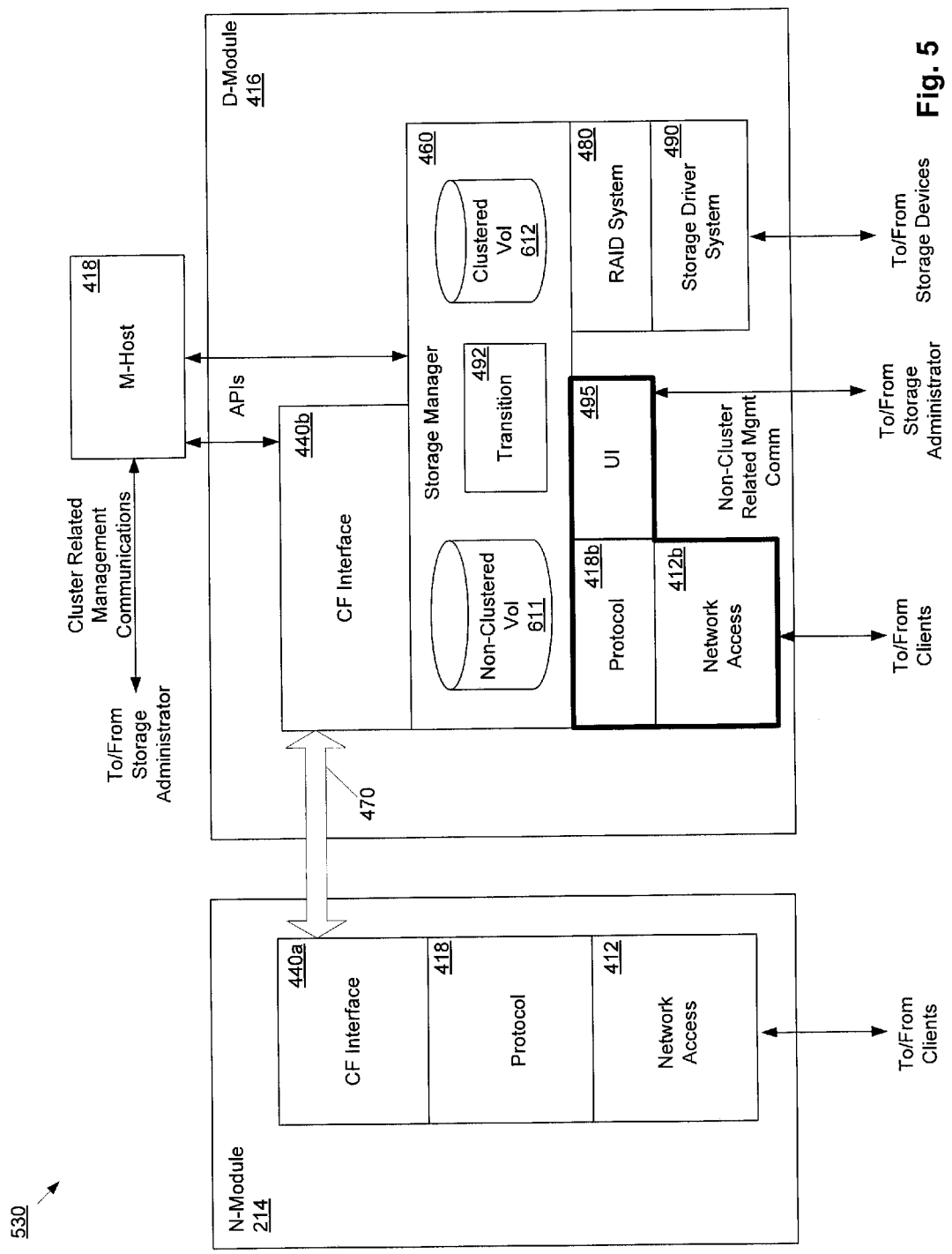
FIG. 5 illustrates an example of a storage operating system of a storage server node in accordance with the techniques introduced here.

FIG. 5 shows an example of a storage operating system 530 that can be used to implement the techniques introduced here. Storage operating system 530 can be used in place of storage operating system 330 in FIG. 4, to enable the node 208 in which operating system 530 resides to function as a complete, independent storage server, while at the same time functioning as a node 208 in a storage server cluster. Hence, a complete individual storage server can coexist and operate concurrently with a storage cluster node, on the same hardware, e.g., within the same storage controller. In that case, the individual storage server is independently operable and independently manageable, i.e., independently of the cluster, even though it shares hardware with the cluster. Likewise, the cluster is operable independently of the individual storage server. What is meant here by "independently operable" (or other similar phrasing) is that the data paths of the cluster and an individual storage server are independent of each other, stored data is divided between the cluster and the individual storage server, and the administration of the cluster and the individual storage server is mostly if not entirely separated. Thus, by employing this technique, a network storage controller can effectively have two different "personalities", one as a cluster node and another an individual storage server. Further, a given number, N, of storage controllers can effectively operate as N+1 storage servers, i.e., as N individual storage servers plus a storage server cluster.

Storage operating system 530 can be assumed to be substantially identical to storage operating system 330 in all significant aspects, except as will be noted here. First, storage operating system 530 includes an additional protocol stack and user interface in its D-module 416. Specifically, the D-module 416 includes additional network access layer 412b and protocol layer 418b, which are substantially identical to those in the N-module 214, and it also includes additional user interface module 495. The network access layer 412b and a protocol layer 418b in a D-module 216 are logically coupled to (and below) the storage manager 460. The addition of network access layer 412b, protocol layer 418b and user interface module 495 enables D-module 416 to function as an independent (non-clustered) storage server while at the same time functioning as a cluster node. D-module 216 can function as a complete, independent storage server (which does not make use of N-module 214), while at the same time functioning as the D-module of a cluster node 208.

User interface module 495 is also coupled logically to the storage manager 460. In one embodiment, user interface 495 provides a GUI and/or CLI and facilitates management functions in a similar manner to M-host 218, except that it does not support management functions/commands that are by definition cluster-related.

Storage manager 460 also includes an additional module, i.e., transition module 492. Transition module 492 is responsible for carrying out the transitioning of the contents of volumes from ownership by individual storage servers to ownership by the cluster, or vice versa, the manner discussed below. Transition module 492 can also transition an entire virtual filer (VFiler) to cluster ownership. Transition of a volume or VFiler is driven (commanded) from the M-Host 418.

Usage and Examples

Upon deploying a storage system, storage administrators may desire, at least initially, to operate the system in a non-clustered manner. Accordingly, by employing storage operating system 530, two or more storage controllers incorporating storage operating system 530 can be connected in the configuration of FIG. 2, but where each node 208 initially operates as an individual, non-clustered storage server. Note that this does not preclude, and is not inconsistent with, operating the nodes 208 as CFO partners, which is not "clustering" as that concept is used herein.

At some time after initial deployment of the storage system, however, a storage administrator may conclude it is desirable to have some of the benefits of clustering. For example, having data maintained by a storage cluster, rather than an individual storage server, enables more efficient load balancing and allows the location of data to be optimized, while keeping the location of data transparent to users. It also facilitates growth of the system as storage needs increase. However, the administrator may be reluctant to convert the entire system and all of its data into a clustered system all at one once, since doing so would require significant time and effort and could be disruptive to users in terms of locating and accessing data.

Accordingly, the techniques introduced here allow a storage cluster to be created dynamically (i.e., at run time) on the same physical hardware (the same storage controllers) as two or more existing non-clustered storage servers. The cluster operates concurrently with, yet independently of, the individual storage servers with which it shares the same hardware. The cluster can be utilized either immediately or at some convenient later time, and data volumes owned by the individual storage servers can be transitioned gradually to ownership by the cluster (and vice versa) on an individual basis, by adding volumes to the global namespace of the cluster. When the cluster is initially created, it does not have to own any data, i.e., it can be completely empty and remain empty until such time that a network administrator deems it appropriate to transition ownerships of one or more data volumes to the cluster. A data volume owned by the cluster can reside on any D-module 416 within the cluster, yet it can be accessed by a user in the same manner through any N-module 214 in the cluster, while the node in which that data volume resides can be kept completely transparent to users and administrators. In contrast, a data volume owned by an individual (non-clustered) storage server is accessible only through that particular storage server, and its location on that storage server is known to users and administrators.

Figure 6:
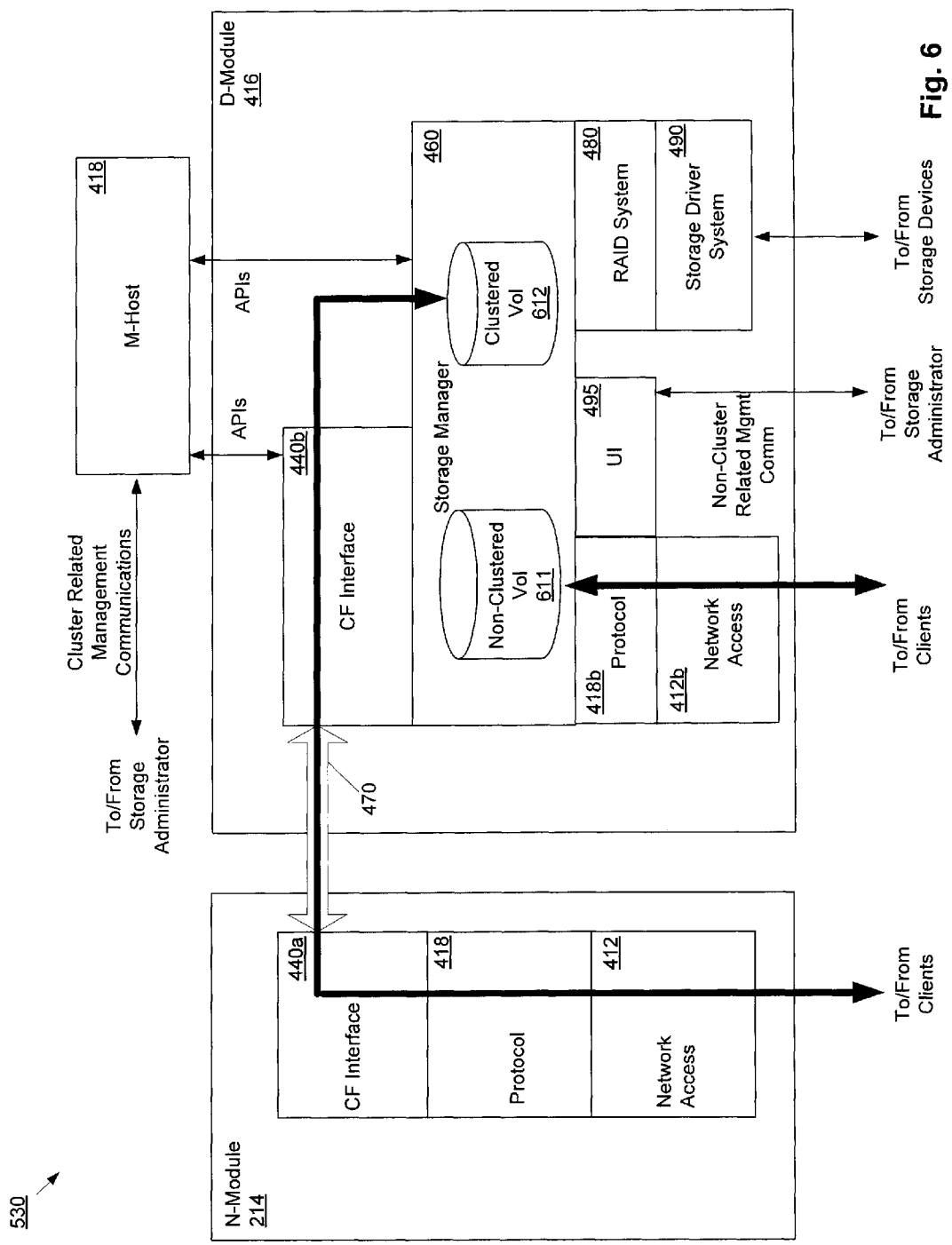
FIG. 6 shows the data access paths for a clustered volume and a non-clustered volume that reside in the same D-module.

Referring to FIG. 6, any data volume 611 which is owned by an individual storage server is accessed from the client side only through the network access layer 412b and protocol layer 418b in the D-module 216 of that individual storage server. Management functions related to such data are also performed exclusively through the user interface 495 in that D-module. On the other hand, any data volume 612 owned by the cluster is accessed from the client side through an N-module 214 (any N-module in the cluster), and management functions related to such data are performed through an M-host 218 (any M-host in the cluster). In both scenarios, back-end access to a volume's data in persistent storage is performed by the storage manager 460 via the RAID system 480 and storage driver system 490 in the D-module 416.

Cluster Creation and Volume Transition

Figure 7:
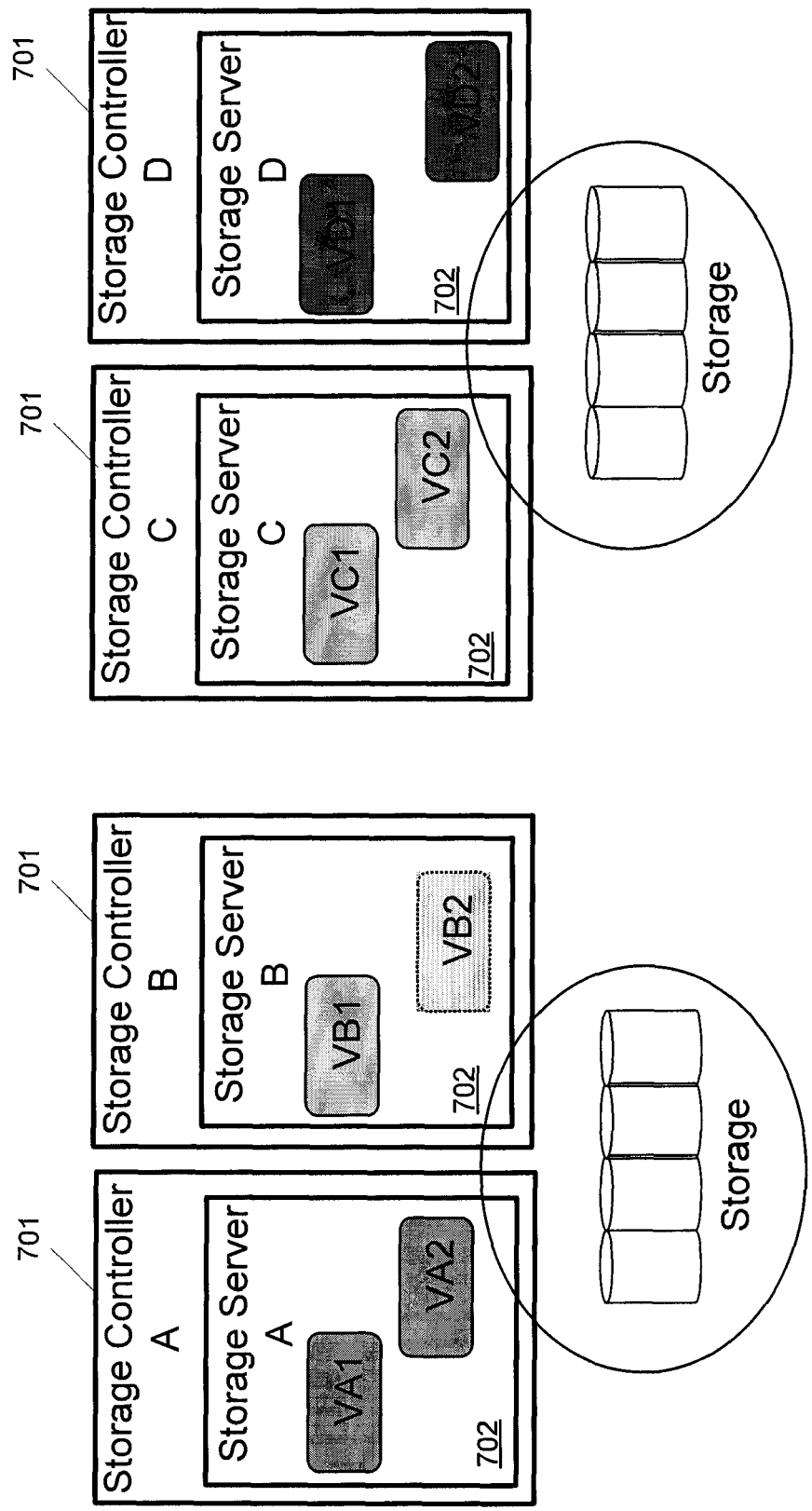
FIGS. 7 through 11 schematically illustrate an example of transitioning volumes from individual server ownership to cluster ownership.
Figure 8:
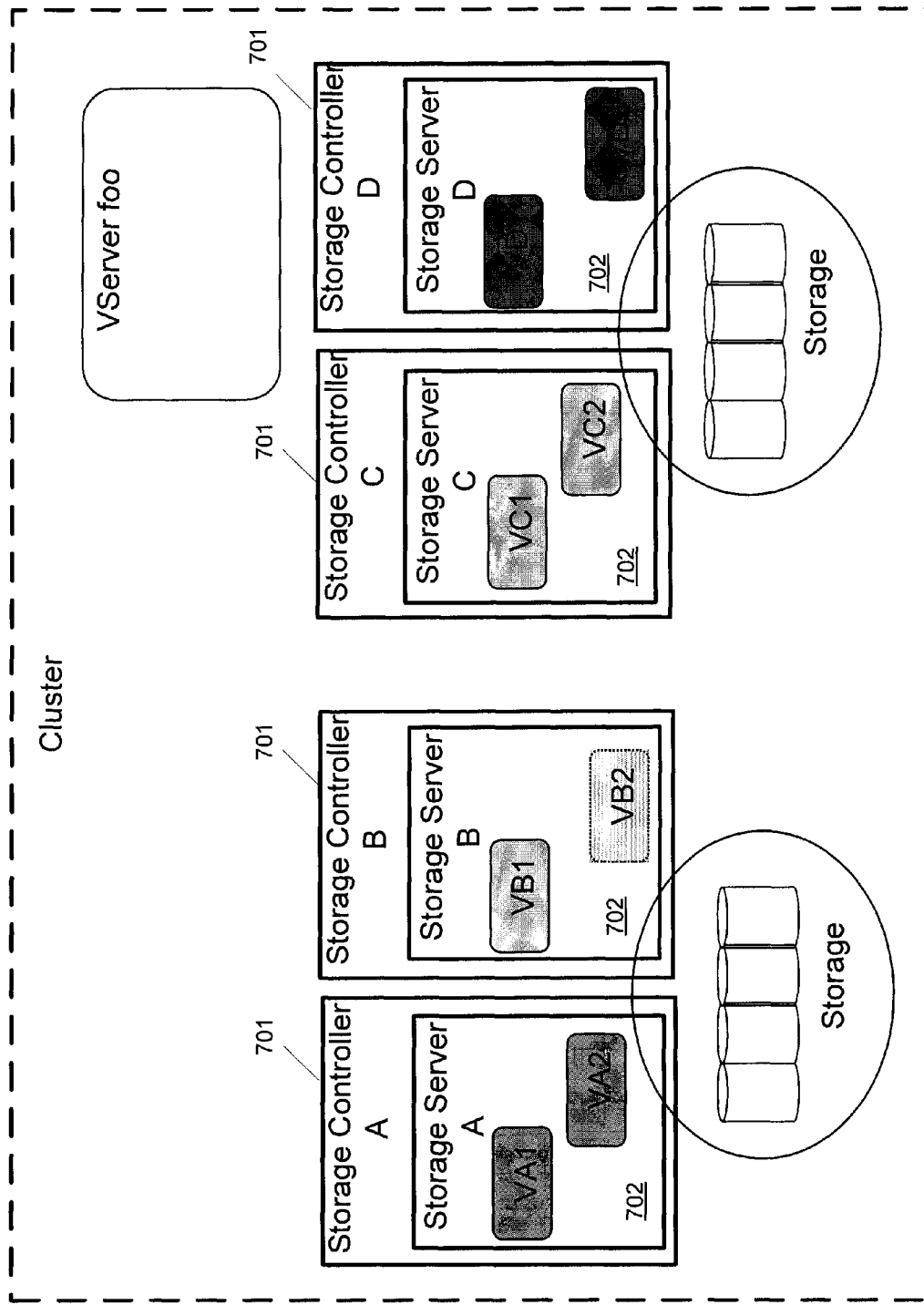

The process of forming a cluster and transitioning ownership of volumes from individual storage servers to the cluster will now be described further with reference to FIGS. 7 through 11. Note, however, that the techniques introduced here also enable transitioning of a volume owned by the cluster to ownership by an individual storage server, in a similar manner. FIG. 7 shows four storage controllers 701, i.e. storage controller A, storage controller B, storage controllers C, and storage controller D, each of which includes an independent (non-clustered) storage server 702. Each of the four storage servers 702 in FIG. 7 is assumed to include a storage operating system such as operating system 530 in FIG. 5 but is currently operating only as an independent (non-clustered) storage server. Two or more of the storage servers 702 may be configured to operate as CFO partners.

At some later time, it becomes desirable to create a cluster from the storage servers 702. Accordingly, a storage administrator first makes sure that all of the storage controllers 701 that are to be members of the cluster (in this example, storage controllers A, B, C and D) are physically connected through a cluster switching fabric, such as cluster switching fabric 210 in FIG. 2, which enables communication using the intra-cluster communication link 470. Then the storage administrator inputs a "Cluster Create" command to the M-host 418 within any of these storage servers. In response to that command, the receiving M-host 418 causes a new cluster to be defined from the node 208 in which that M-host 418 is located. That is, the Cluster Create command creates a new storage cluster of one node. This command includes as a parameter the base license for the cluster. In addition, the Cluster Create command may include parameters to specify:

the name of the cluster to be created;
the IP address of the node's first cluster port;
the netmask assigned to the node's first cluster port;
the maximum transmission unit value (e.g., in bytes) assigned to the node's first cluster port;
the IP address of the node's second cluster port;
the netmask assigned to the node's second cluster port;
the maximum transmission unit value (e.g., in bytes) assigned to the node's second cluster port.

To add nodes to the cluster, another command, "Cluster Join", can be used (input to an M-Host 418) to specify each additional node to be added.

As part of the creation of the new cluster, one or more entities called virtual servers ("vservers") are created in the cluster. A vserver is a single file system namespace which is collectively implemented by all of the nodes in the cluster (i.e., it is global to the cluster). In this context, a vserver is also an instance of an application service provided to a client system. A cluster can be organized into any suitable number of vservers, although for purposes of this explanation, only one vserver is assumed to be created, which vserver is named "foo". Each vserver has a user domain and a security domain that are separate from the user and security domains of any other vserver. Moreover, each vserver is associated with one or more VIFs and can span, one or more physical nodes, each of which can hold one or more VIFs and storage associated with one or more vservers. Client systems can access the data on a vserver via any node of the cluster, but only through the VIFs associated with that vserver. Vservers are described further in co-pending U.S. patent application Ser. No. 12/287, 099, filed on Oct. 6, 2008 and entitled, "Read-Only Mirroring for Load Sharing," by F. Rabii et al., which is incorporated herein by reference.

Figure 9:
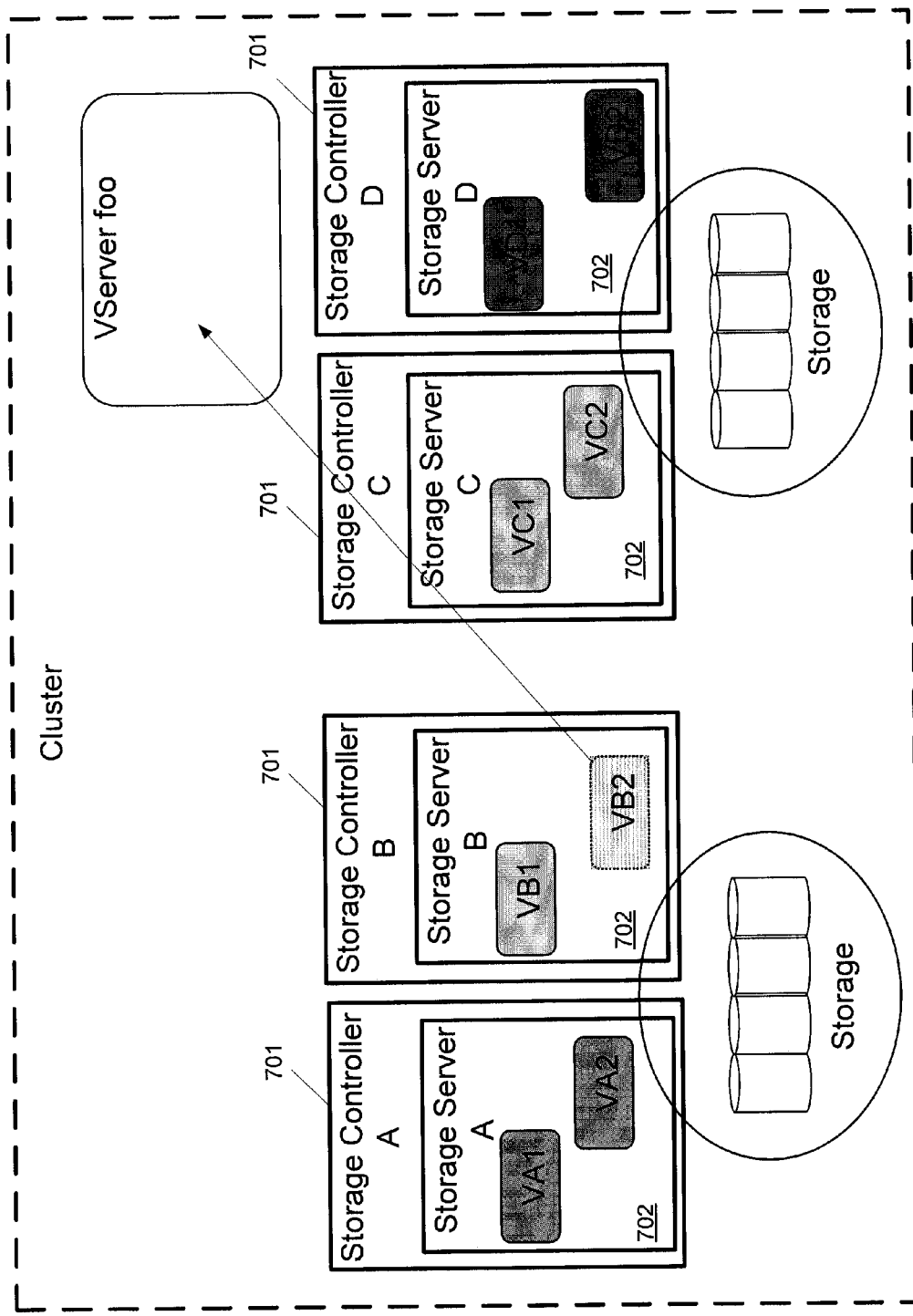
Figure 10:
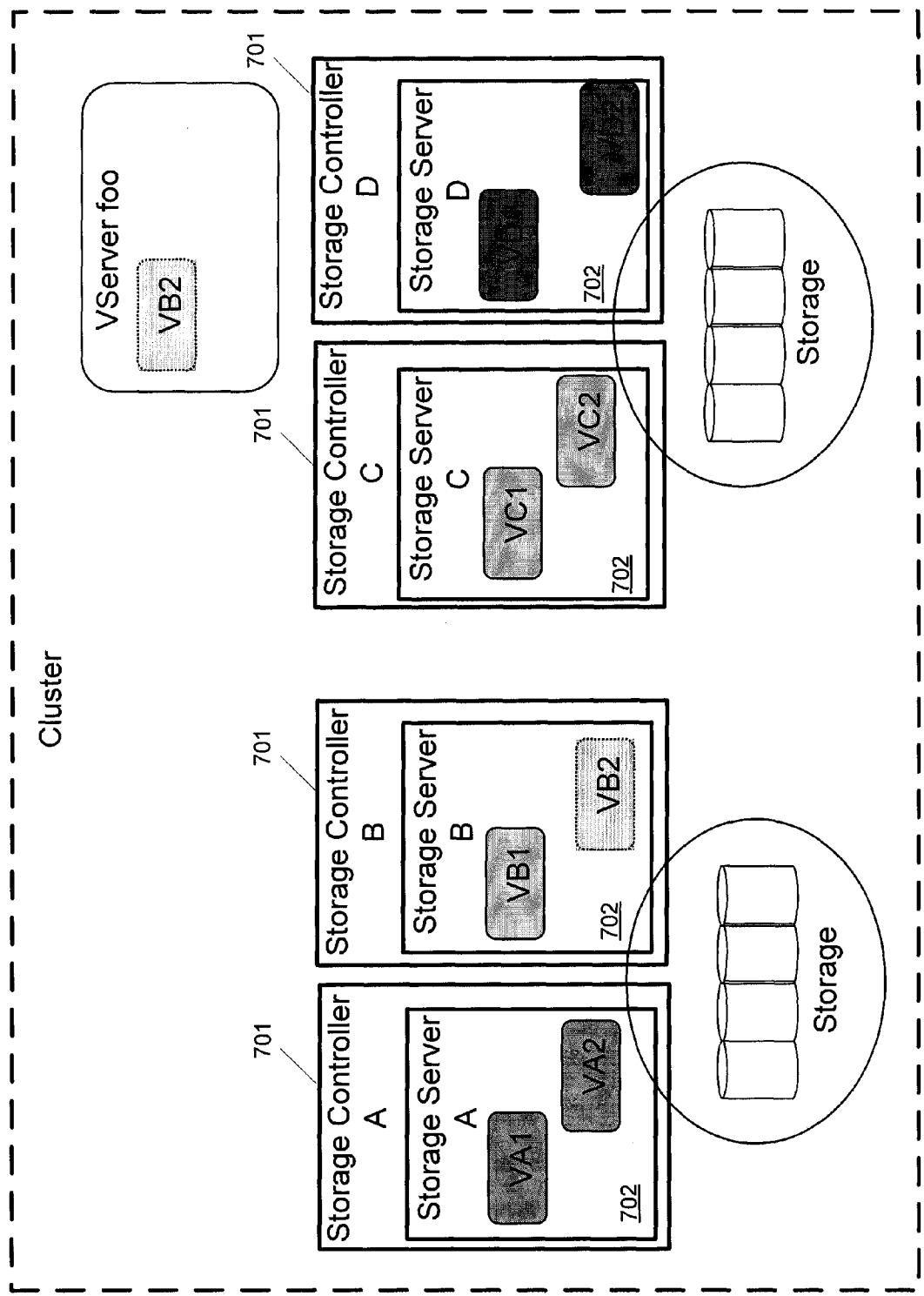
Figure 11:
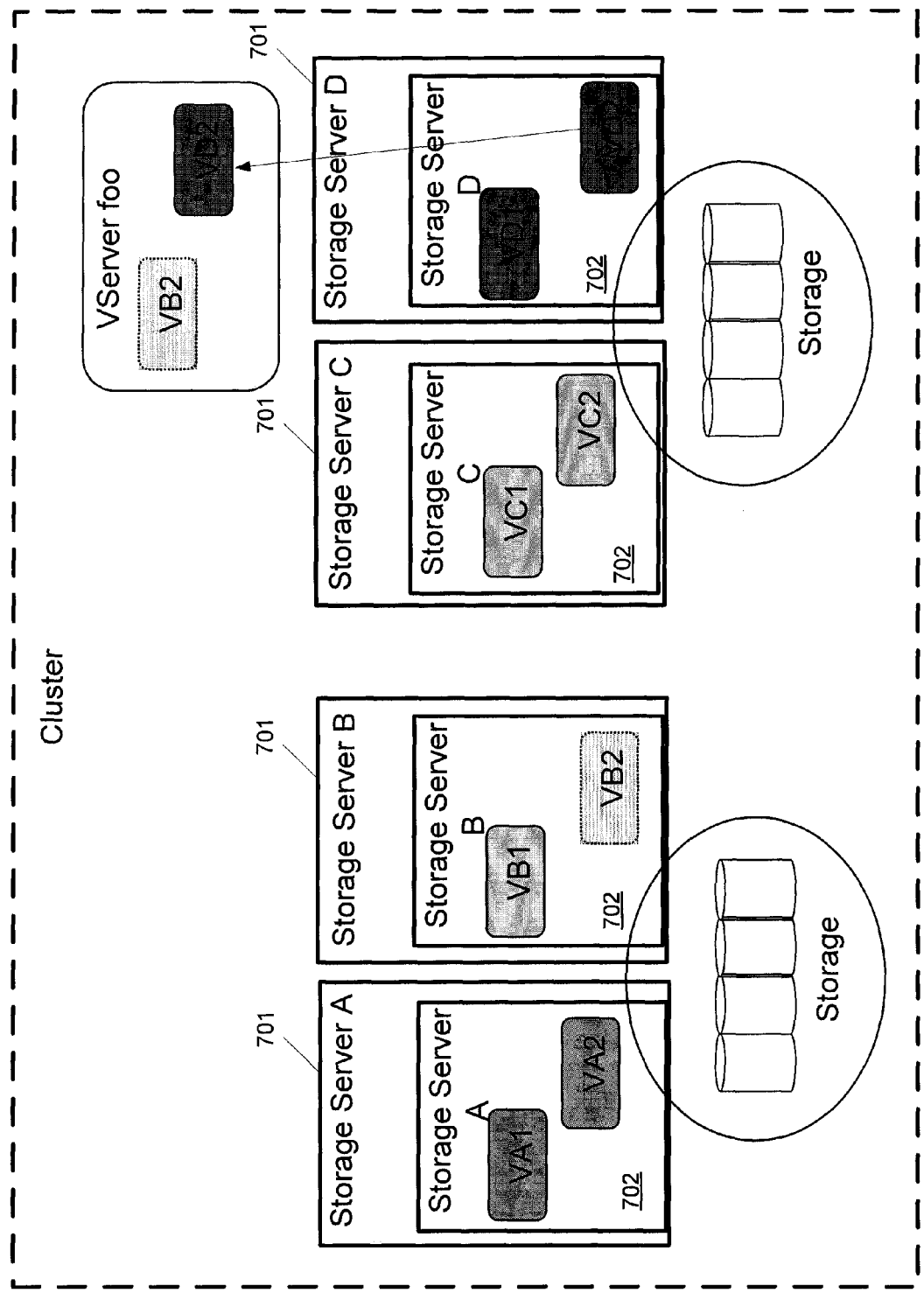

Referring now to FIG. 9, once the cluster has been created and a vserver has been defined for it, any volume can be transitioned so that it is owned by the cluster instead of by an individual storage server. For example, it may be desirable to transition volume VB2, which is initially owned by storage server B, to ownership by the cluster. Accordingly, this can be accomplished by adding volume VB2 into the global namespace, vserver foo, as shown in FIGS. 9 and 10. The process of transitioning the volume can be initiated by an administrator inputting into the M-host 418 a "Volume Transition" command specifying as parameters the volume or volumes to be transitioned. The manner in which this is accomplished is described further below. Likewise, any other volume owned by an individual storage server can be transitioned to cluster ownership in the same way, as shown in FIG. 11 regarding volume VD2.

Once a volume is transitioned to cluster ownership, it can be accessed by users or administrators through any node (e.g., any storage server) in the cluster. The volume may continue to reside in the same server/node immediately after the ownership transition, however, normal operation of the cluster may result in the volume being copied or moved to different nodes in the cluster for various reasons which are not germane here. Yet after the transition to cluster ownership, which node the volume resides in is transparent to users and administrators, unlike a volume owned by an individual storage server. In at least some embodiments, any given volume is owned exclusively by either one individual storage server or by the cluster, but not both. Note that after one or more volumes have been transitioned to cluster ownership, any volume still owned by an individual storage server can still be accessed through that individual storage server (and only that particular storage server), in the same manner as before the cluster was created.

Thus, a set of storage servers can operate as both a clustered system and a non-clustered system at the same time. Further, it can be seen that by using these techniques, any system of N independent storage servers (where N=4 in the illustrative embodiment of FIGS. 7 through 11) can, in effect, be converted into N+1 storage servers, where the (N+1)th storage server is a storage cluster.

Figure 12:
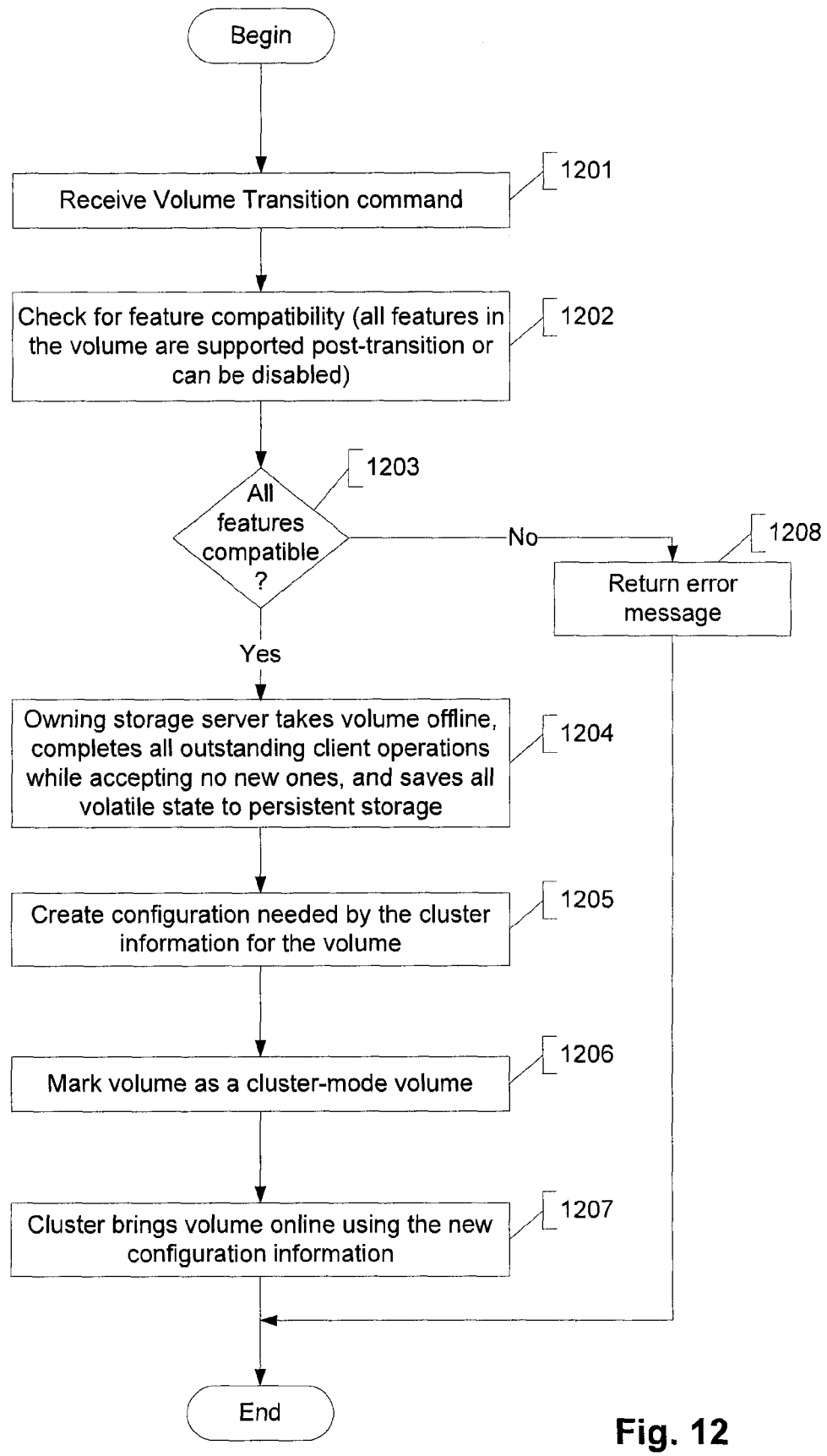
FIG. 12 is a flow diagram of a process of transitioning a volume from individual server ownership to cluster ownership.

FIG. 12 illustrates a process for transitioning a volume from ownership by an individual storage server to ownership by the cluster. It will be appreciated that this process can be applied to one or more volumes owned by a storage server in like manner, and in fact can be applied simultaneously to all volumes owned by a storage server to transition those volumes simultaneously to cluster ownership.

Initially, at 1201 an M-host 418 receives from a storage administrator a Volume Transition command, specifying as parameters the volume (or volumes) to be transitioned. At 1202 the M-host checks for feature compatibility of the volume, i.e., it determines whether all features in the volume are supported by the cluster or if they are not supported, can be disabled. Assuming all features are compatible (1203), the process continues to 1204; otherwise, the M-host 418 returns an error message to the administrator at 1208, and the process ends.

At 1204, the storage manager 460 of the storage server which owns the volume takes the specified volume off-line, completes all outstanding client operations (e.g., reads and or writes) while accepting no new client operations, and saves all volatile state for the volume to persistent storage (e.g., disks).

At 1205 the storage manager 460 creates configuration information needed by the cluster for the volume. This includes storing a DSID and an MSID for the volume in two places: on disk in the volume itself and in the VLDB. The VLDB tracks the identities and mappings (MSIDs-to-DSIDs) of all volumes in the system, as noted above. This also includes storing in the VLDB the junction that points to the volume, if any, the vserver that owns the volume, and the export rules for the volume, along with its role as the root volume of a vserver namespace (if it is root, then there is no junction that points to it; otherwise, there is a junction inode in some other volume in the cluster that points to this volume).

After creating the configuration information, the storage manager 460 then marks the volume at 1206 as a cluster-mode volume both on disk and in the VLDB and then brings the volume online at 1207, using the newly created configuration information (for every volume in the storage system, the VLDB includes an indication of whether or not that volume is a cluster-mode volume). This completes the process. It will be recognized that the reverse transition, i.e. a transition from cluster ownership to ownership by a particular individual storage server, can be carried out in a similar manner, such as by reversing the above described process, subject to appropriate minor modifications that will be readily apparent to those skilled in the art.

The techniques introduced above can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A network storage system comprising:
a plurality of storage controllers;
a plurality of storage servers, each implemented in a separate one of the plurality of storage controllers, each of the storage servers configured to present to users a separate system image of stored data; and
a storage server cluster including a plurality of cooperating storage server nodes, distributed among said plurality of storage controllers, the storage server cluster configured to present to users a single system image of data stored in the storage server cluster independently of the storage server node or nodes in which said data resides, the storage server cluster being configured to operate concurrently with operation of at least one of the plurality of storage servers, wherein the storage server cluster is configured to operate independently of the plurality of storage servers, wherein the plurality of storage servers separately implement a plurality of distinct file systems, and wherein the storage server nodes of the storage server cluster collectively implement one or more file systems in a single global namespace.

2. The network storage system recited in claim 1, wherein the plurality of storage servers are configured to operate independently of each other and to be manageable independently of each other.

3. The network storage system recited in claim 1, wherein user data owned by any particular one of the plurality of storage servers can only be accessed through said particular one of the storage servers that owns said user data, and wherein user data owned by the storage server cluster can be accessed through any of the plurality of storage server nodes.

4. The network storage system recited in claim 1, further comprising:
a transition module to modify a data set owned by one of the plurality of storage servers to be owned by the storage server cluster.

5. The network storage system recited in claim 4, wherein the transition module further is configured to modify a data set owned by the storage server cluster to be owned by one of the plurality of storage servers.

6. A storage controller comprising:
a network interface through which to communicate with a storage client over a network;
a storage interface through which to communicate with a mass storage subsystem;
a processor coupled to the network interface and the storage interface, to control operation of the storage controller; and a storage medium coupled to the processor and having stored therein code which configures the processor to enable the storage controller to operate as one of a plurality of independent storage servers in a network storage system;

operate as at least a portion of a node of a plurality of storage server nodes in a storage server cluster that is distributed among a plurality of storage controllers; and maintain concurrently data volumes of a first type and data volumes of a second type, wherein each data volume of the first type is accessible only through a single storage server which owns said volume, and each data volume of the second type is accessible to users through any of the plurality of storage server nodes in the cluster, and wherein a location within the network storage system of a data volume of the second type is transparent to said users, wherein the plurality of storage servers separately implement a plurality of distinct file systems, and wherein the storage server nodes of the storage server cluster collectively implement one or more file systems in a single global namespace.

7. The storage controller recited in claim 6, further comprising code which configures the processor to modify the data set owned by the storage server to be owned by the storage server cluster.

8. The storage controller recited in claim 6, wherein each of the plurality of storage servers presents to users a separate system image of stored data, and wherein data stored in the storage server cluster is presented to users as a single system image regardless of where said data stored in the storage server cluster physically resides.

9. The storage controller recited in claim 6, wherein the plurality of storage servers are configured to operate independently of each other and to be manageable independently of each other.

10. The storage controller recited in claim 9, wherein the storage server cluster is configured to operate independently of the plurality of storage servers.

11. A method comprising:

presenting, to a user of a network storage system, a separate system image of stored data for each of a plurality of storage servers in the network storage system, each of the storage servers implemented in a separate one of a plurality of storage controllers;

while at least one of the plurality of storage servers is operational, creating a storage server cluster which is distributed among said plurality of storage controllers and which includes a plurality of storage server nodes; and presenting, to a user of the storage cluster, a single system image of data stored in the storage server cluster, where the single system image is independent of the storage server node or nodes in which said data resides, wherein the storage server cluster is configured to operate independently of the plurality of storage servers, wherein the plurality of storage servers separately implement a plurality of distinct file systems, and wherein the storage server nodes of the storage server cluster collectively implement one or more file systems in a single global namespace.

12. The method recited in claim 11, operating the storage server cluster and at least one of the plurality of storage servers concurrently and independently to service user-initiated data access requests.

13. The method recited in claim 11, wherein user data owned by any particular one of the plurality of storage servers can only be accessed through said particular one of the storage servers that owns said user data, and wherein user data owned by the storage server cluster can be accessed through any of the plurality of storage servers.

14. The method recited in claim 13, further comprising: modifying data set owned by one of the plurality of storage servers to be owned by the storage server cluster.

15. A method comprising:

accessing a data set that is owned by only one storage server of a plurality of storage servers in a network storage system, each of the storage servers implemented in a separate one of a plurality of storage controllers, wherein the network storage system further includes a storage server cluster that is distributed among the plurality of storage controllers and includes a plurality of storage server nodes, wherein data owned by any one of the plurality of storage servers is accessible only through the storage server that owns said data; and modifying the data set that is owned by only one storage server of the plurality of storage servers so that the data set becomes owned by the storage server cluster, such that the data set becomes accessible to users through all of the plurality of storage server nodes, wherein a location of the data set within the network storage system is transparent to said users, wherein the plurality of storage servers separately implement a plurality of distinct file systems, and wherein the storage server nodes of the storage server cluster collectively implement one or more file systems in a single global namespace.

16. The method recited in claim 15, further comprising:

presenting, to a user of a network storage system, a separate system image of stored data for each of a plurality of storage servers in the network storage system; and presenting, to a user of the storage cluster, a single system image of data stored in the storage server cluster regardless of the storage server node or nodes in which said data physically resides.

17. The method recited in claim 15, operating the storage server cluster and at least one of the plurality of storage servers concurrently and independently to service user-initiated data access requests.

18. The method recited in claim 17, wherein the plurality of storage servers are configured to operate independently of each other and to be manageable independently of each other.

19. A method comprising:

operating a storage controller as a storage server of a plurality of independent storage servers in a network storage system, including maintaining a volume of a first type in the storage server; and operating the storage controller as at least a portion of a node of a plurality of storage server nodes within a storage server cluster, including maintaining a volume of a second type, wherein any data volume of the first type owned by the storage server is accessible to users only through the storage server, and wherein any data volume of the second type is accessible to users through any of the plurality of storage server nodes, and wherein a location within the network storage system of any data volume of the second type is transparent to said users, wherein the plurality of storage servers separately implement a plurality of distinct file systems, and wherein the storage server nodes of the storage server cluster collectively implement one or more file systems in a single global namespace.

20. The method recited in claim 19, further comprising:
maintaining a data volume owned by only said storage server, wherein the data volume is accessible to users only through said storage server; and
modifying the data volume so that the data volume is owned by the storage server cluster, such that the data volume becomes accessible to users through all of the plurality of storage server nodes, wherein a location of the data volume within the network storage system is transparent to said users.

* * * * *